United States Patent
Glashan et al.

(10) Patent No.: US 10,366,383 B2
(45) Date of Patent: Jul. 30, 2019

(54) COMBINED RELIABLE AND UNRELIABLE DATA TRANSMISSION

(71) Applicant: Square, Inc., San Francisco, CA (US)

(72) Inventors: Ross Glashan, San Francisco, CA (US); Nicholas Hebner, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 375 days.

(21) Appl. No.: 15/088,021

(22) Filed: Mar. 31, 2016

(65) Prior Publication Data

US 2017/0286943 A1  Oct. 5, 2017

(51) Int. Cl.
| | | |
|---|---|---|
| *G06Q 20/32* | (2012.01) | |
| *H04L 1/12* | (2006.01) | |
| *H04L 1/16* | (2006.01) | |
| *H04W 4/80* | (2018.01) | |
| *H04W 76/14* | (2018.01) | |

(52) U.S. Cl.
CPC ............. *G06Q 20/327* (2013.01); *H04L 1/12* (2013.01); *H04L 1/1628* (2013.01); *H04W 4/80* (2018.02); *H04W 76/14* (2018.02); *H04L 1/1685* (2013.01)

(58) Field of Classification Search
CPC ..... G06Q 20/327; G06Q 20/32; H04W 76/14; H04W 4/80
USPC ........ 705/16, 18, 21, 34; 370/328, 252, 312, 370/350; 455/41.2, 78, 411, 416
See application file for complete search history.

(56) References Cited

U.S. PATENT DOCUMENTS

| | | | |
|---|---|---|---|
| 5,434,395 A | 7/1995 | Storck et al. | |
| 5,679,945 A | 10/1997 | Renner et al. | |
| D405,070 S | 2/1999 | Kitagawa et al. | |
| D411,524 S | 6/1999 | Kitagawa et al. | |
| 6,088,431 A * | 7/2000 | LaDue | ................ H04M 15/854 379/114.2 |
| 6,167,383 A | 12/2000 | Henson | |
| D491,953 S | 6/2004 | Arakaki et al. | |

(Continued)

FOREIGN PATENT DOCUMENTS

| | | |
|---|---|---|
| EP | 2 136 499 A1 | 12/2009 |
| EP | 3 361 455 A1 | 8/2018 |

(Continued)

OTHER PUBLICATIONS

International Search Report and Written Opinion for International Application No. PCT/US2017/025106, dated Jul. 3, 2017.

(Continued)

*Primary Examiner* — Vanel Frenel
(74) *Attorney, Agent, or Firm* — Maynard Cooper & Gale, LLP; Chitra M. Kalyanaraman, Esq.

(57) ABSTRACT

A payment reader and a merchant device may communicate over a wireless connection. Reliable and unreliable packets may be transmitted over a single messaging path. Each of a plurality of unreliable packet may include a data payload and a packet identifier. The unreliable packets and a reliable packet may be transmitted over the single messaging path during a first connection event. A response to the reliable packet may be received during the second event and may include a received packet listing. If the received packet listing indicates that any of the unreliable packets were not received, any unreliable packet that was not received may be retransmitted.

29 Claims, 7 Drawing Sheets

(56) References Cited

U.S. PATENT DOCUMENTS

| | | | |
|---|---|---|---|
| D495,700 S | 9/2004 | Mukai et al. | |
| D500,039 S | 12/2004 | Chen | |
| D537,445 S | 2/2007 | Bousfield | |
| D598,013 S | 8/2009 | Ju et al. | |
| D624,912 S | 10/2010 | Chen et al. | |
| D624,915 S | 10/2010 | Ferreira Sanchez | |
| 7,860,789 B2 | 12/2010 | Hirka et al. | |
| D641,740 S | 7/2011 | Jeon et al. | |
| D650,377 S | 12/2011 | Akana et al. | |
| D653,664 S | 2/2012 | Turnbull et al. | |
| D654,885 S | 2/2012 | Isaias | |
| D656,097 S | 3/2012 | Nomi et al. | |
| D657,784 S | 4/2012 | Akana et al. | |
| D660,834 S | 5/2012 | Akana et al. | |
| D675,173 S | 1/2013 | Paradise et al. | |
| D676,047 S | 2/2013 | White et al. | |
| D680,537 S | 4/2013 | Miller et al. | |
| D681,639 S | 5/2013 | Cruz et al. | |
| D686,198 S | 7/2013 | Lewis et al. | |
| D688,241 S | 8/2013 | Miller et al. | |
| 8,532,270 B2 * | 9/2013 | Katis | H04L 12/1831 379/93.01 |
| D696,255 S | 12/2013 | Bousfield et al. | |
| D700,606 S | 3/2014 | Lo | |
| D702,239 S | 4/2014 | Lee et al. | |
| D704,176 S | 5/2014 | Kwak et al. | |
| D705,201 S | 5/2014 | Isaacs et al. | |
| D706,266 S | 6/2014 | Rotsaert | |
| D709,069 S | 7/2014 | Cruz et al. | |
| D711,876 S | 8/2014 | McWilliam et al. | |
| 8,818,867 B2 | 8/2014 | Baldwin et al. | |
| D716,304 S | 10/2014 | Orthey | |
| D719,561 S | 12/2014 | Akana et al. | |
| 9,058,172 B2 | 6/2015 | Babu et al. | |
| 9,063,737 B2 | 6/2015 | Babu et al. | |
| D736,207 S | 8/2015 | Bousfield et al. | |
| D740,285 S | 10/2015 | Templeton | |
| D740,286 S | 10/2015 | Templeton | |
| D740,819 S | 10/2015 | Weber et al. | |
| D740,820 S | 10/2015 | Templeton et al. | |
| 9,390,297 B2 | 7/2016 | Babu et al. | |
| D766,238 S | 9/2016 | Nguyen | |
| D766,901 S | 9/2016 | Nguyen | |
| 9,507,972 B2 | 11/2016 | Babu et al. | |
| D774,510 S | 12/2016 | Rotsaert | |
| D776,658 S | 1/2017 | Zhu et al. | |
| 9,542,678 B1 | 1/2017 | Glashan et al. | |
| 9,576,159 B1 | 2/2017 | Templeton et al. | |
| D780,731 S | 3/2017 | Kim et al. | |
| D797,739 S | 9/2017 | Templeton | |
| D797,740 S | 9/2017 | Nguyen | |
| 9,800,293 B2 | 10/2017 | Smith et al. | |
| 9,864,424 B1 | 1/2018 | Templeton et al. | |
| 9,870,557 B2 | 1/2018 | Babu et al. | |
| 9,980,304 B2 | 5/2018 | Huang et al. | |
| 2003/0009705 A1 | 1/2003 | Thelander et al. | |
| 2004/0056091 A1 | 3/2004 | Overhultz et al. | |
| 2004/0087339 A1 * | 5/2004 | Goldthwaite | G06Q 20/10 455/558 |
| 2004/0177132 A1 | 9/2004 | Zhang et al. | |
| 2005/0221858 A1 | 10/2005 | Hoddie | |
| 2006/0142058 A1 | 6/2006 | Elias et al. | |
| 2006/0157565 A1 | 7/2006 | Shiomi | |
| 2006/0219776 A1 | 10/2006 | Finn | |
| 2007/0079156 A1 | 4/2007 | Fujimoto | |
| 2007/0147332 A1 * | 6/2007 | Lappetelainen | H04W 74/06 370/346 |
| 2008/0137586 A1 * | 6/2008 | Jones | H04B 7/155 370/315 |
| 2008/0287062 A1 | 11/2008 | Claus et al. | |
| 2009/0106571 A1 | 4/2009 | Low et al. | |
| 2009/0291705 A1 * | 11/2009 | Bennett | H04W 52/24 455/522 |
| 2010/0070785 A1 | 3/2010 | Fallin et al. | |
| 2010/0269059 A1 | 10/2010 | Othmer et al. | |
| 2010/0308976 A1 | 12/2010 | Seban et al. | |
| 2011/0029416 A1 | 2/2011 | Greenspan | |
| 2011/0070834 A1 | 3/2011 | Griffin et al. | |
| 2011/0096710 A1 * | 4/2011 | Liu | H04L 1/1614 370/312 |
| 2011/0110263 A1 | 5/2011 | Yi et al. | |
| 2011/0153437 A1 | 6/2011 | Archer et al. | |
| 2011/0312271 A1 | 12/2011 | Ma et al. | |
| 2012/0016760 A1 | 1/2012 | Lee et al. | |
| 2012/0089461 A1 | 4/2012 | Greenspan | |
| 2012/0118959 A1 | 5/2012 | Sather et al. | |
| 2012/0126011 A1 | 5/2012 | Lamba et al. | |
| 2012/0132712 A1 | 5/2012 | Babu et al. | |
| 2012/0150673 A1 | 6/2012 | Hart | |
| 2012/0312879 A1 | 12/2012 | Rolin et al. | |
| 2013/0018740 A1 | 1/2013 | Fisher | |
| 2013/0052950 A1 * | 2/2013 | Hillan | H04W 8/005 455/41.1 |
| 2013/0069768 A1 | 3/2013 | Madhyastha et al. | |
| 2013/0117139 A1 | 5/2013 | DiMattina et al. | |
| 2013/0124348 A1 | 5/2013 | Lal et al. | |
| 2013/0163510 A1 * | 6/2013 | Chakravarthy | H04L 1/1685 370/328 |
| 2013/0166402 A1 | 6/2013 | Parento et al. | |
| 2013/0256414 A1 | 10/2013 | Liu et al. | |
| 2013/0314214 A1 | 11/2013 | Leica et al. | |
| 2014/0127995 A1 | 5/2014 | Hendricksen et al. | |
| 2014/0149240 A1 | 5/2014 | Ansel et al. | |
| 2014/0157016 A1 | 6/2014 | Rajagopal | |
| 2014/0171108 A1 * | 6/2014 | Waters | H04W 4/02 455/456.1 |
| 2014/0372781 A1 | 12/2014 | Klappert | |
| 2015/0058227 A1 * | 2/2015 | Dua | G06Q 20/20 705/67 |
| 2015/0127182 A1 | 5/2015 | Inagi et al. | |
| 2015/0148093 A1 | 5/2015 | Huang et al. | |
| 2015/0248152 A1 | 9/2015 | Postea et al. | |
| 2016/0117813 A1 | 4/2016 | Gross et al. | |
| 2017/0289795 A1 | 10/2017 | Glashan et al. | |

FOREIGN PATENT DOCUMENTS

| | | |
|---|---|---|
| KR | 10-1140919 B1 | 5/2012 |
| WO | 2012/003892 A1 | 1/2012 |
| WO | 2014/008310 A1 | 1/2014 |
| WO | 2014/106183 A1 | 7/2014 |
| WO | 2017/173126 A1 | 10/2017 |
| WO | 2018/118332 A1 | 6/2018 |

OTHER PUBLICATIONS

Notice of Allowance dated Aug. 30, 2016, for U.S. Appl. No. 15/088,013, of Glashan, R., et al., filed Mar. 31, 2016.

Non-Final Office Action dated May 8, 2014, for U.S. Appl. No. 13/603,941, of Babu, A., et al., filed Sep. 5, 2012.

Non-Final Office Action dated May 12, 2014, for U.S. Appl. No. 13/603,992, of Babu, A., et al., filed Sep. 5, 2012.

Notice of Allowance dated Feb. 9, 2015, for U.S. Appl. No. 13/603,992, of Babu, A., et al., filed Sep. 5, 2012.

Notice of Allowance dated Feb. 17, 2015, for U.S. Appl. No. 13/603,941, of Babu, A., et al., filed Sep. 5, 2012.

Ex Parte Quayle Action dated Apr. 9, 2015, for Design U.S. Appl. No. 29/447,767, of Templeton, T., filed Mar. 6, 2013.

Notice of Allowance dated Jun. 5, 2015, for Design U.S. Appl. No. 29/447,767, of Templeton, T., filed Mar. 6, 2013.

Non-Final Office Action dated Jul. 9, 2015, for U.S. Appl. No. 14/709,375, of Babu, A., et al., filed May 11, 2015.

Certificate of Industrial Design Registration for European Design Patent Application No. 002873877-0001, mailed Nov. 23, 2015.

Certificate of Industrial Design Registration for European Design Patent Application No. 002873877-0002, mailed Nov. 23, 2015.

Examination Report for European Design Patent Application No. 002873877-0001/002873877-0002, dated Dec. 1, 2015.

Certificate of Industrial Design Registration for Australian Design Patent Application No. 201516289 mailed Dec. 15, 2015.

(56) References Cited

OTHER PUBLICATIONS

Certificate of Industrial Design Registration for Australian Design Patent Application No. 201516287 mailed Dec. 15, 2015.
Non-Final Office Action dated Jan. 21, 2016, for U.S. Appl. No. 14/709,375, of Babu, A., et al., filed May 11, 2015.
First Examination Report for Indian Design Patent Application No. 277744, dated Mar. 8, 2016.
Notice of Allowance dated Mar. 9, 2016, for U.S. Appl. No. 14/874,301, of Babu, A., et al., filed Oct. 2, 2015.
First Examination Report for Indian Design Patent Application No. 277745, dated Mar. 11, 2016.
English-language translation of First Office Action for Japanese Design Patent Application No. 2015-026523, dated Mar. 15, 2016.
English-language translation of First Office Action for Japanese Design Patent Application No. 2015-026521, dated Mar. 15, 2016.
Notice of Allowance dated May 17, 2016, for Design U.S. Appl. No. 29/528,683, of Nguyen, A.P., filed May 29, 2015.
Notice of Allowance dated May 17, 2016, for Design U.S. Appl. No. 29/532,633, of Nguyen, A.P., filed Jul. 8, 2015.
Certificate of Industrial Design Registration for Canadian Design Patent Application No. 165621 mailed on Jun. 23, 2016.
Certificate of Industrial Design Registration for Canadian Design Patent Application No. 165620 mailed on Jun. 23, 2016.
English-language translation of Decision of Registration for Japanese Design Patent Application No. 2015-026523, mailed Jul. 5, 2016.
English-language translation of Decision of Registration for Japanese Design Patent Application No. 2015-026521, mailed Jul. 5, 2016.
Notice of Allowance dated Jul. 28, 2016, for U.S. Appl. No. 14/709,375, of Babu, A., et al., filed May 11, 2015.
Certificate of Industrial Design Registration for Japanese Design Patent Application No. 2015-026523, mailed Aug. 12, 2016.
Certificate of Industrial Design Registration for Japanese Design Patent Application No. 2015-026521, mailed Aug. 12, 2016.
Certificate of Industrial Design Registration for Indian Design Patent Application No. 277744, mailed Aug. 23, 2016.
Certificate of Industrial Design Registration for Indian Design Patent Application No. 277745, mailed Sep. 26, 2016.
Office Action for European Patent Application No. 13 740 420.8, dated Feb. 7, 2017.
Non-Final Office Action dated Mar. 22, 2017, for U.S. Appl. No. 15/390,247, of Templeton, T., et al., filed Dec. 23, 2016.
Notice of Allowance dated May 12, 2017, for Design U.S. Appl. No. 29/575,535, of Nguyen, A.P., filed Aug. 25, 2016.
Non-Final Office Action dated May 19, 2017, for U.S. Appl. No. 15/336,597, of Babu, A., et al., filed Oct. 27, 2016.
Notice of Allowance dated Jun. 12, 2017, for Design U.S. Appl. No. 29/539,783, of Templeton, T., filed Sep. 17, 2015.
Notice of Allowance dated Aug. 30, 2017, for U.S. Appl. No. 15/390,247, of Templeton, T., et al., filed Dec. 23, 2016.
Notice of Allowance dated Sep. 8, 2017, for U.S. Appl. No. 15/336,597, of Babu, A., et al., filed Oct. 27, 2016.
Corrected Notice of Allowance dated Sep. 25, 2017, for U.S. Appl. No. 15/390,247, of Templeton, T., et al., filed Dec. 23, 2016.
Non-Final Office Action dated Nov. 30, 2017, for U.S. Appl. No. 14/861,398, of Dorogusker, J., et al., filed Sep. 22, 2015.
Final Office Action dated Jun. 12, 2018, for U.S. Appl. No. 14/861,398, of Dorogusker, J., et al., filed Sep. 22, 2015.
Advisory Action dated Aug. 10, 2018, for U.S. Appl. No. 14/861,398, of Dorogusker, J., et al., filed Sep. 22, 2015.
International Search Report and Written Opinion for International Patent Application No. PCT/US2013/049162, dated Oct. 16, 2013.
International Search Report and Written Opinion for International Application No. PCT/US2017/062890, dated Jan. 22, 2018.
Extended European Search Report for European Patent Application No. 18159594.3, dated May 8, 2018.
Fried, I., "Stampt Aims to Take the Coffee Shop Punch Card Digital," dated Jul. 20, 2011, Retrieved from the Internet URL: http://allthingsd.com/20110720/stampt-aims-to-take-the coffee-shop-punch-card-digital/, on Nov. 16, 2015, pp. 1-3.
Huang, S.H., et al., "Computer-assisted supply chain configuration based on supply chain operations reference (SCOR) model," Computers & Industrial Engineering, Elsevier, vol. 48, Issue 2, pp. 377-394 ( Mar. 2005 ).
Jorgensen, A., "Square," Andrew Jorgensen Family, dated Nov. 19, 2010, Retrieved from the Internet URL: http://andrew.jorgensenfamily.us/2010/11/square/, on Jun. 6, 2014, pp. 1-3.
Reitz, S., "Tabbedout: The Iphone App that lets you close your Tab without really opening one," dated Apr. 9, 2012, retrieved from the Internet URL: http://www.dallasobserver.com/restaurants/tabbedout-theiphone-app-that-lets-you-close-your-tab-without-really-opening-one-7025599, on Nov. 19, 2015, pp. 1-2.
Sahivitz, M., "MICROS Announces Partnership with TabbedOut: Big Nod for Mobile Payment Acceptance," dated May 11, 2011, Retrieved from the Internet URL: http://tech.co/micros-tabbedout-2011-05, on Nov. 16, 2015, pp. 1-5.
Thomas, T., "iPhone Credit Card Readers," Top Ten Reviews, dated Feb. 11, 2011, Retrieved from the Internet URL: http://credit-card-processingreview.toptemeviews.com/mobile-credit-card-processing/iphone-credit-card-readers-og9.html, on Jun. 6, 2014, pp. 1-3.
Walsh, M., "Stampt App to End Paper Loyalty Cards," dated Jul. 24, 2011, Retrieved from the Internet URL: http://loyalty360.org/resources/article/stampt-app-to-end-paper-loyalty-cards, on Nov. 16, 2015, pp. 1-6.
Notice of Allowance dated Nov. 7, 2018, for U.S. Appl. No. 14/861,398, of Dorogusker, J., et al., filed Sep. 22, 2015.
Non-Final Office Action dated Dec. 27, 2018, for U.S. Appl. No. 15/294,430, of Glashan, R., et al., filed Oct. 14, 2016.
Non-Final Office Action dated Dec. 28, 2018, for U.S. Appl. No. 14/863,642, of Rezayee, A., et al., filed Sep. 24, 2015.

* cited by examiner

COMBINED RELIABLE AND UNRELIABLE DATA TRANSMISSION

BACKGROUND

Retail transactions such as purchases may be performed with payment devices such as a credit card or a NFC-enabled smart phone running a payment application. A traditional payment terminal may reside at a fixed location and may have a physical connection to a power source such as an AC outlet. The payment terminal may also be physically connected to a wired communication interface such as a phone line or Ethernet connection. The payment terminal receives payment information such as a credit card number from the payment device and communicates with a remote server such as a payment server to determine whether the transaction is approved.

Such a traditional payment terminal may not be suitable for many businesses. Taxis, food trucks, delivery services, professional service providers, and other similar businesses engage in transactions from a vehicle or at disparate locations. Applications running on a mobile device such as smart phone or tablet may provide a user interface to facilitate payment transactions and a communication interface for communicating with the payment server. However, a separate payment reader may be necessary in order to interface with the payment device. The payment reader and mobile device may communicate wirelessly. The payment reader and mobile device may exchange a large volume of data in order to process payment transactions, provide software updates to the payment reader, and otherwise interface between the two devices.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

A payment system may include a merchant device and a payment reader. The payment reader may physically interact with payment devices such as EMV payment cards and NFC payment devices. The merchant device may provide a rich user interface, communicate with the payment reader, and also communicate with a payment server. In this manner, the merchant device and payment reader may collectively process transactions between a merchant and a customer.

The payment reader and the merchant device may communicate over a wireless connection such as Bluetooth low energy (BLE). The BLE connection may include a number of messaging paths, which may be implemented as BLE characteristics. Each characteristic may permit both reliable and unreliable communications. Reliable communications may be implemented with acknowledgement packets, which require a positive acknowledgement response from the receiving device before additional packets may be transmitted. Unreliable communications may be implemented with unacknowledged packets, which can be transmitted in succession without receiving an acknowledgement.

When data is to be transmitted between the payment reader and the merchant device, the data may be parsed into a number of data portions. Each data portion may be assigned to an unacknowledged packet along with a packet identifier. A plurality of unacknowledged packets may then be transmitted during a single connection event over a single messaging path (e.g, a single characteristic). An acknowledgement packet may then be transmitted during the same connection event over the same messaging path.

The receiving device may receive one or more of the packets that were transmitted during this first connection event. For each unacknowledged packet that was successfully received, the receiving device may extract the packet identifier. Based on the extracted packet identifiers the receiving device may generate a received packet listing, which may be provided as the payload of an acknowledgement response packet that is transmitted to the original transmitting device during a second connection event.

The original transmitting device may receive the acknowledgement response packet and extract the received packet listing. Based on a comparison of the packet identifiers of the unacknowledged packets and the received packet listing, the original transmitting device may determine whether all of the unacknowledged packets were received by the original receiving device. If all of the unacknowledged packets were not received, and packets that were not received may be retransmitted.

Figure 1:
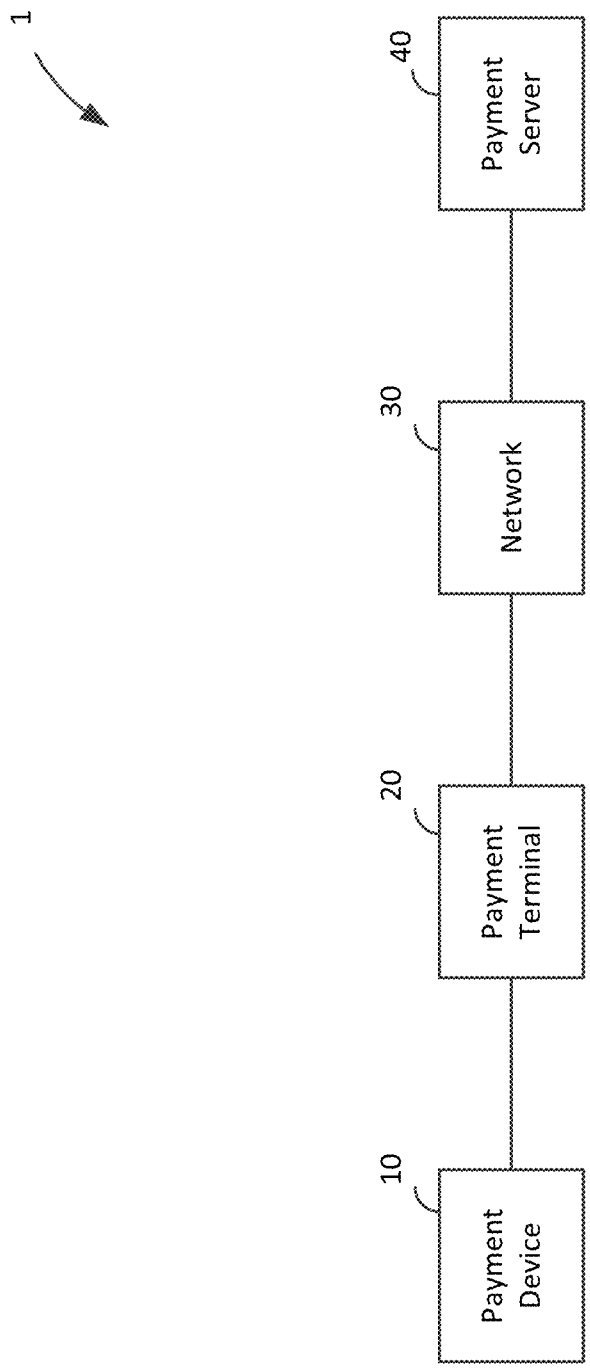
FIG. 1 shows an illustrative block diagram of a payment system in accordance with some embodiments of the present disclosure.

FIG. 1 depicts an illustrative block diagram of a payment system 1 in accordance with some embodiments of the present disclosure. In one embodiment, payment system 1 includes a payment device 10, payment terminal 20, network 30, and payment server 40. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system and one or more banks of the merchant and customer. The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
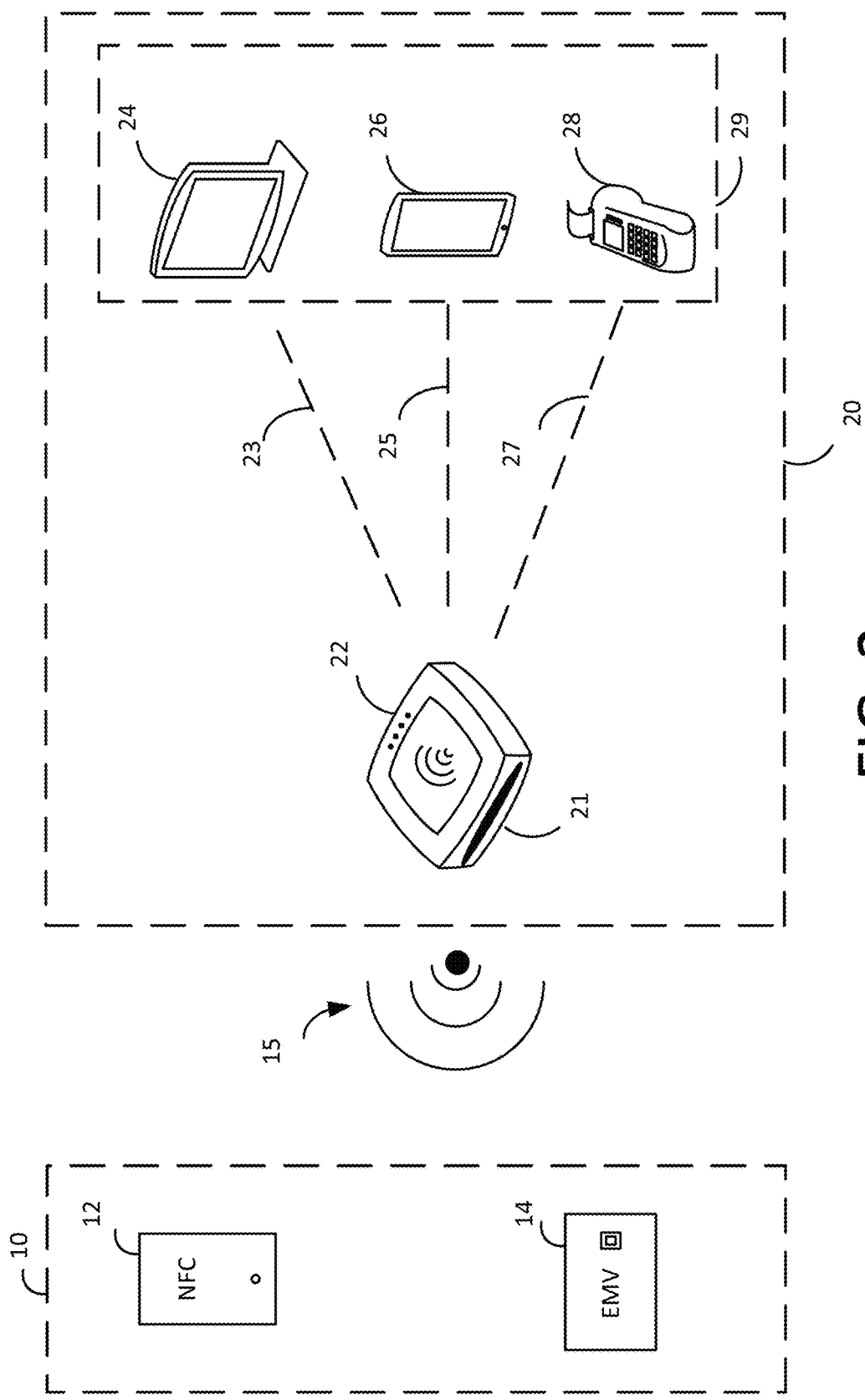
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 13092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., WiFi, Bluetooth, NFC, or ZigBee) connection, in one embodiment payment reader 22 may communicate with the merchant device 29 via a Bluetooth low energy (BLE) interface, such that the payment reader 22 and the merchant device 29 are connected devices. In some embodiments processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
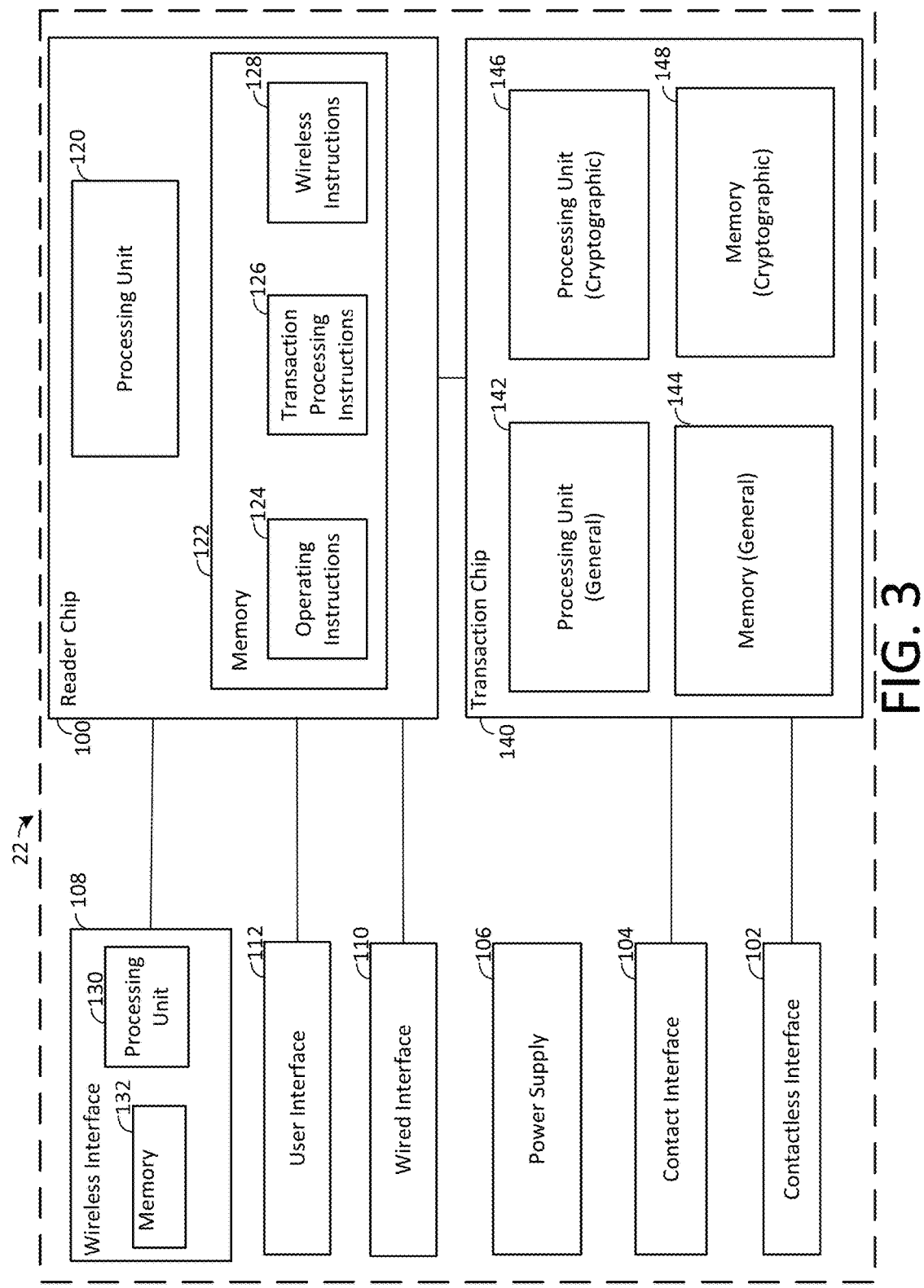
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may be a wireless communication device that communicates wirelessly with an interactive electronic device such as a merchant device 29, for example, using BLE. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. In one embodiment, payment reader 22 includes a reader chip 100, a plurality of payment interfaces (e.g., a contactless interface 102 and a contact interface 104), a power supply 106, a wireless communication interface 108, a wired interface 110, a user interface 112, and a transaction chip 140. Reader chip 100 of payment reader 22 includes a processing unit 120 and memory 122. Transaction chip 140 of payment reader 22 includes a general processing unit 142, cryptographic processing unit 146, general memory 144, and cryptographic memory 148. Although in one embodiment the processing units and memories will be described as packaged in a reader chip 100 and transaction chip 140 respectively, and configured in a particular manner, it will be understood that processing unit 120, general processing unit 142, cryptographic processing unit 146, memory 122, general memory 144, and cryptographic memory 148 may be configured in any suitable manner to perform the functionality of the payment reader 22 as is described herein. It will also be understood that the functionality of reader chip 100 and transaction chip 140 may be embodied in a single chip or a plurality of chips, each including any suitable combination of processing units and memory to collectively perform the functionalities of reader chip 100 and transaction chip 140 as described herein.

In some embodiments, reader chip 100 may be any suitable chip, such as a K21 chip supplied by Freescale Semiconductor, Inc. Processing unit 120 of reader chip 100 of payment reader 22 may be any suitable processor and may include any suitable hardware, software, memory, and circuitry as is necessary to perform and control the functions of payment reader 22. Processing unit 120 may include any suitable number of processors, and may perform the operations of reader chip 100 based on instructions in any suitable number of memories and memory types. In some embodiments, processing unit 120 may have multiple independent processing units, for example a multi-core processor or other suitable component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108, circuitry for interfacing with a wired interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

Transaction chip 140 may include one or more processors having processing capability necessary to perform the processing functions described herein, including but not limited to hardware logic, computer readable instructions running on a processor, or any suitable combination thereof. In an exemplary embodiment, transaction chip 140 may include two RISC processors and may perform functionality relating to processing of payment transactions, interfacing with payment devices, cryptography, and other payment-specific functionality. In some embodiments, transaction chip 140 may include a general processing unit 142 for executing instructions associated with general payment functionality and a cryptographic processing unit 146 for handling cryptographic processing operations. Each of general processing unit 142 and cryptographic processing unit 146 may have dedicated memory associated therewith (i.e., general memory 144 and cryptographic memory 148). In this manner, specific cryptographic processing and critical security information (e.g., cryptographic keys, passwords, user information, etc.), may be isolated from other circuitry of transaction chip 140 and securely stored and processed by cryptographic processing unit 146 and stored at cryptographic memory 148.

One or both of general processing unit 142 and cryptographic processing unit 146 of transaction chip 140 may communicate with reader chip 100 (e.g., processing unit 120), for example, using any suitable internal bus and communication technique. In this manner, reader chip 100 and transaction chip 140 can collectively process transactions and communicate information regarding processed transactions (e.g., with merchant device 29).

Transaction chip 140 may also include circuitry for interfacing with a contact interface 104 (e.g., power and communication circuitry for directly interfacing with an EMV chip of a chip card 14 that is inserted in slot 21). In some embodiments, transaction chip 140 may also include analog front end circuitry for interfacing with the analog components of contactless interface 102 (e.g., electromagnetic compatibility (EMC) circuitry, matching circuits, modulation circuitry, and measurement circuitry).

In some embodiments, general processing unit 142 may include any suitable processor for performing the payment processing functionality of payment reader 22 described herein. In some embodiments, general memory 144 may be any suitable memory (e.g., as described herein), and may include a plurality of sets of instructions for performing general transaction processing operations of payment reader 22, such as transaction processing instructions, data authentication instructions, and signal conditioning instructions, any of which may be implemented entirely or partially in firmware stored at memory 144.

Transaction processing instructions may include instructions for controlling any suitable general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 146, and any other suitable aspects of transaction processing.

Data authentication instructions may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 168 may include configuration instructions such as TMS-CAPK instructions. In some embodiments, the TMS-CAPK may be tailored for a particular jurisdiction (e.g., country-specific). Signal conditioning instructions may include instructions for interacting with a contactless interface and signal conditioning circuitry for the contactless interface, including instructions for conditioning signals received from a payment device 10 via the contactless interface 102 (e.g., from a NFC payment device 10). Signal conditioning instructions may include instructions for conditioning signals using any suitable hardware, logic, or algorithm required to process NFC signals received via contactless interface 102.

Cryptographic processing unit 146 may be any suitable a processor as described herein, and, in some embodiments, may perform cryptographic functions for the processing of payment transactions. For example, in some embodiments a cryptographic processing unit 146 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 148 may be any suitable memory or combination thereof as described herein, and may include a plurality of sets of instructions for performing cryptographic operations, such as payment processing instructions and cryptographic instructions. Payment processing instructions may include instructions for performing aspects of payment processing, such as providing for encryption techniques to be used in association with particular payment procedures, accessing account and processing information, any other suitable payment processing functionality, or any suitable combination thereof. Cryptographic instructions may include instructions for performing cryptographic operations. Cryptographic processing unit 146 may execute the cryptographic instructions to perform a variety of cryptographic functions, such as to encrypt, decrypt, sign, or verify a signature upon payment and transaction information as part of a payment transaction.

Wireless communication interface 108 may include any suitable wireless communications hardware (e.g., antennas, matching circuitry, etc.) and one or more processors having processing capability necessary to engage in wireless communication (e.g., with a merchant device 29 via a protocol such as BLE) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a Texas Instruments CC2640 device, which may include a processing unit 130 and memory 132. Although in one embodiment, the processing unit 130 and memory 132 will be described as packaged in a wireless communication interface 108 and configured in a particular manner, it will be understood that processing unit 130 and memory 132 may be configured in any suitable manner to perform the functionality of the wireless communication interface 108 as is described herein.

Processing unit 130 may include any suitable processor or processing hardware for performing the functionality of wireless interface 108 as described herein. In some embodiment, processing unit 130 may execute the instructions of memory 132 to interact with and control hardware and other components of the wireless communication interface 108 in order to transmit and receive wireless communications (e.g., via BLE) and to communicate with other circuitry (e.g., processing unit 120 of reader chip 100) of payment reader 22 (e.g., using an internal bus or any other suitable communication method). Memory 132 is memory, as described herein, and may include wireless instructions for performing the processing operations of wireless communication interface 108. In some embodiments, memory 132 may be implemented as static random-access memory (SRAM), but any suitable memory format may be used to carry out the functionality of payment reader 22 as described herein. Wireless instructions 132 may include instructions for interacting with processing unit 120 of reader chip 100, in order to perform functions such as sending and receiving messages, configuring aspects of a BLE connection, and controlling bonding and pairing of wireless communication interface 108 to other devices (e.g., to merchant device 29 using BLE).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 13092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card are able to exchange information such as payment information.

Power supply 106 may include one or more power supplies such as a physical connection to AC power or a battery. Power supply 106 may include power conversion circuitry for converting AC power and generating a plurality of DC voltages for use by components of payment reader 22. When power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components.

Wired interface 110 may include any suitable interface for wired communication with other devices or a communication network, such as USB, Lightning, FireWire, Ethernet, any other suitable wired communication interface, or any combination thereof. In some embodiments, wired interface 110 may allow payment reader to communicate with one or both of merchant device 29 and payment server 40.

User interface 112 may include any suitable user interface (e.g., buttons, touchscreen, keyboard, voice recognition, biometric readers, etc.) that allow a user to directly interact with a payment reader 22. In some embodiments, many of the user interface interactions with a payment reader 22 may be accomplished by a point-of-sale application running on a merchant device 29, and may be communicated via either wireless interface 108 or wired interface 110. User interface 112 may be a simple interface, such as a single button or limited set of buttons. Different types or sequences of button presses (e.g., holding a button down for more than a threshold time, particular sequences of button presses, etc.) may implement different functionality at the payment reader 22.

Memory 122 of reader chip 100 may include a plurality of sets of instructions for controlling operations of payment reader 22, such as operating instructions 124, transaction processing instructions 126, and wireless instructions 128.

Operating instructions 124 may include instructions for controlling any suitable general operations of the payment reader 22, such as internal communications, power management, processing of messages, system monitoring, sleep modes, user interface response and control, operation of the wireless interface 108, operation of the transaction chip 140, and the management of the other sets of instructions. In one embodiment, the operating instructions 124 may provide the operating system and applications necessary to perform most of the processing operations that are performed by the processing unit 120 of the reader chip 100 of payment reader 22.

Operating instructions 124 may also include instructions for interacting with a merchant device 29. In one embodiment, the merchant device 29 may be running a point-of-sale application. The operating instructions 124 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 124 facilitate processing of the payment, for example, by acquiring payment information via the contactless interface 102 or contact interface 104, invoking the transaction chip 140 to process that payment information, and by generating responsive messages that are transmitted to the point-of-sale application of the merchant device via wireless interface 108.

Operating instructions 124 may also include instructions for interacting with a payment server 40. In one embodiment, a payment server 40 may be associated with the payment reader 22 and the point-of-sale application of the merchant device 29. For example, the payment server 40 may have information about payment readers 22 and merchant devices 29 that are registered with the payment server 40 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100 and transaction chip 140) and communicate that processed payment information to the point-of-sale application, which in turn communicates with the payment server 40. In this manner, messages from the payment reader 22 may be forwarded to the payment server 40, such that the payment reader 22 and payment server 40 may collectively process the payment transaction.

Transaction processing instructions 126 may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 126 may perform high level processing, and provide instructions for processing unit 120 to communicate with transaction chip 140 to perform most transaction processing operations.

Wireless instructions 128 may include instructions for configuring a wireless interface, managing wireless pairing/bonding, optimizing throughput of the wireless connection, engaging in wireless communications, and controlling any other suitable functionality relating to the operation of a wireless interface of the payment reader (e.g., wireless interface 108). Although wireless instructions may operate in conjunction with any suitable wireless interface 108, in an exemplary embodiment the wireless interface 108 may be a BLE interface.

In some embodiments, wireless instructions 128 may include instructions for configuring wireless interface 108. In some embodiments, processing unit 120 of reader chip 100 may execute wireless instructions 128 to exchange messages in order to communicate with wireless interface 108 to configure the wireless interface 108 for operation. Any suitable parameters may be configured based on the wireless instructions, such as settings related to pairing/bonding (e.g., General Access Profile (GAP) settings, advertising modes, discovery modes, available roles, and white lists) and connections (e.g., General Attribute Protocol (GATT) settings, connection intervals, and maximum transmission units).

In some embodiments, wireless instructions 128 may include instructions for managing wireless pairing/bonding between wireless interface 108 and a wireless interface of the merchant device 29. In some embodiments, wireless instructions may enforce a structured procedure for establishing, maintaining, and modifying connections between payment reader 22 and merchant device 29. Although any suitable structured procedure may be implemented by wireless instructions 128, in some embodiments an exclusive connection may be established between payment reader 22 and a single merchant device 29. Procedures may also be established for payment reader 22 to enter states where it may advertise for possible exclusive bonds with other merchant devices 29, for example, based on a user input.

In some embodiments, wireless instructions 128 may include optimizing throughput of a wireless connection between the wireless interface 108 of the payment reader 22 and a wireless interface of the merchant device 29. In some embodiments, payment reader 22 may modify certain parameters of a particular BLE connection with a merchant device 29 in order to optimize the connection (e.g., for a desired throughput, etc.). The payment reader 22 may set the parameters itself, and in some embodiments, may communicate with merchant device 29 to receive a request to modify the parameters. For example, in some embodiments, the processing unit 120 of reader chip 100 of payment reader 22 may have low-level access to commands that are exchanged with wireless interface 108, such that payment reader 22 may modify numerous parameters that cannot be modified by a point-of-sale application running on a merchant device 29, which may only be able to modify a limited subset of parameters or provide high-level commands (e.g., through a required API for the BLE interface of the merchant device 29). In an embodiment, if a point-of-sale application operating on a merchant device 29 desires to monitor or modify lower-level parameters of the BLE connection (e.g., maximum transmission units and connection intervals) it may communicate with the payment reader 22 to acquire the desired information or modify the lower level parameter.

In some embodiments, wireless instructions 128 may include instructions for engaging in wireless communications between a processing unit of payment reader 22 (e.g., processing unit 120) and processing of the merchant device 29, via the wireless interface 108 of the payment reader 22 and a wireless interface of the merchant device 29. During an active BLE connection, data packets may be exchanged via one or more BLE characteristics, with data packets able to be sent in modes such as an acknowledged and unacknowledged mode. In an unacknowledged mode, additional packets may be transmitted immediately after the unacknowledged message was sent (i.e., an unreliable message). In an acknowledged mode, additional packets may not be sent until the acknowledgement packet has been acknowledged by the other BLE device (a reliable connection), which occurs during a later connection event between the two devices. In some embodiments, processing unit 120 of reader chip 100 may execute wireless instructions 128 in order to selectively control the selection of acknowledgement packets and unacknowledged packets, for example, based on the type of information being transmitted.

In some embodiments, the payment reader 22 and the merchant device 29 may combine acknowledgement packets and unacknowledged packets in a manner to provide a high-throughput reliable connection. For example, a plurality of data portions may be transmitted using a plurality of unacknowledged packets. A packet identifier may be included within each of the unacknowledged packets. During a single connection event, the device transmitting the data may send multiple unacknowledged packets (each including a data portion and a packet identifier) and the final packet of the connection event may be an acknowledgement packet. The device receiving the packets during the connection event (multiple unacknowledged packets and a final acknowledged packet) may respond to the acknowledgement packet during the next connection event with packet identifiers for all of the received unacknowledged packets. If the packet identifiers associated with all of the unacknowledged packets are received, the original sending device may send the next data portions during the next connection event. If not all of the packet identifiers are received, the missing unacknowledged packet may be resent (e.g., alone, or with additional packets) during the next connection event.

Figure 4:
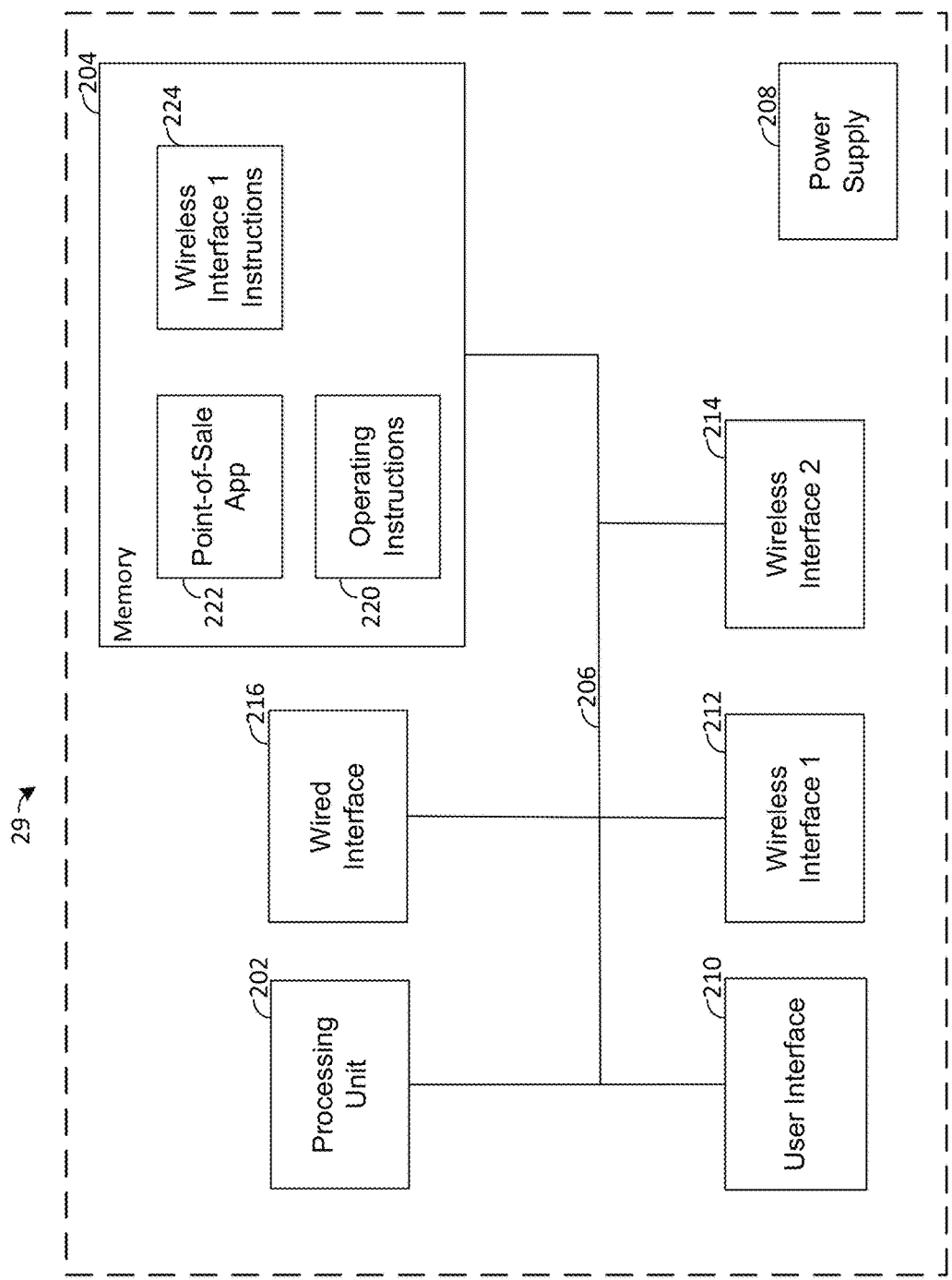
FIG. 4 depicts an illustrative block diagram of a merchant device in accordance with some embodiments of the present disclosure.

FIG. 4 depicts an exemplary merchant device 29 in accordance with some embodiments of the present disclosure. Although a merchant device 29 may be implemented in any suitable manner, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, or any other suitable electronic device having the necessary user interface and communication capabilities to perform the functions described herein.

Although particular components are depicted in a particular arrangement in FIG. 4, it will be understood that merchant device 29 may include additional components, one or more of the components depicted in FIG. 4 may not be included in merchant device 29, and the components of merchant device 29 may be rearranged in any suitable manner. In one embodiment, merchant device 29 includes a processing unit 202, a memory 204, an interface bus 206, a power supply 208, a user interface 210, a first wireless interface 212, a second wireless interface 214, and a wired interface 216.

In one embodiment, the merchant device 29 includes a processing unit 202 and memory 204 that are configured to control and perform the necessary operations of the merchant device 29. In one embodiment, the processing unit 202 of may be a general purpose processor running instructions for a mobile operating system, programs, and applications based on instructions that may be stored in memory 204. The memory 204 may include any suitable memory types or combination thereof as described herein, such as flash memory and RAM memory, for storing instructions and other data and providing a working memory for the execution of the operating system, programs, and applications of the merchant device 29. In one embodiment, the memory 204 may include a plurality of sets of instructions, such as operating instructions 220, point-of-sale application instructions 222, and first wireless interface instructions 224.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as I²C, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 4, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An exemplary user interface 210 may include hardware and software for any suitable user interface, such as a touchscreen interface, voice command interface, keyboard, mouse gesture recognition, any other suitable user interface, or any combination thereof. In one embodiment, the user interface 210 may be a touchscreen interface that displays an interactive user interface for programs and applications such as a point-of-sale application running on the merchant device 29.

Merchant device 29 may also include a plurality of wireless communication interfaces. The wireless communication interfaces may include any suitable hardware and software for providing a wireless communication interface such as Bluetooth classic, BLE, WiFi, cellular, short message service (SMS), NFC, any other suitable wireless communication interface, or any combination thereof. In an embodiment, a first wireless communication interface 212 may be a wireless communication interface that primarily communicates with payment reader 22 (e.g., a BLE interface) while a second wireless communication interface 214 may be a wireless communication interface (e.g., WiFi) that primarily communicates with payment server 40 (e.g., via the internet).

Merchant device may also include a wired interface 216, which may include any suitable interface for wired communication with other devices or a communication network, such as USB, Lightning, FireWire, Ethernet, any other suitable wired communication interface, or any combination thereof.

Memory 204 may include a plurality of sets of instructions for performing the processing operations of merchant device 29, such as operating instructions 220, point-of-sale application instructions 222, first wireless interface instructions 224, and any other suitable instructions for operating the merchant device 29 (e.g., instructions related to the operation of one or more other applications or components of the merchant device 29).

Operating instructions 220 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 220 may include instructions for controlling the operations of the user interface 210. The user interface may be controlled in accordance with the instructions of programs and applications of the operating instructions 220, point-of-sale application instructions 222, and the firmware update instructions 224. In one embodiment, the point-of-sale application instructions 222 may include instructions to display information about BLE bonding and connections with payment readers 22. The display information for connections may include a graphical user interface that guides a user through the process of identifying available payment readers 22, pairing/bonding with payment readers 22, removing pairing/bonding with payment readers 22, and BLE-specific menus that in some aspects (e.g., an administrator role) allow specific configurations of a BLE connection or BLE operations of a connected payment reader 22.

Operating instructions 220 may also include instructions for interacting with a payment reader 22 and for interacting with a payment server 40. The payment reader 22 and/or the application running on the merchant device 29 may be known (e.g., via a registration process) to the payment server 40, such that the merchant device 29 may process payments with the payment server 40 according to the point-of-sale application instructions.

Point-of-sale application instructions 222 include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations. In some embodiments, the point-of-sale application instructions may include instructions for providing a rich display of information relating to payment readers 22 that may be paired/bonded with the merchant device through a BLE interface, and for configuring a BLE connection.

First wireless interface instructions 224 may include instructions for interacting with first wireless interface 212, managing and establishing connections with a payment reader 22, engaging in wireless communications with a payment reader 22, and controlling any other suitable functionality relating to the operation of first wireless interface 212. Although first wireless instructions 224 may operate in conjunction with any suitable first wireless interface 212, in an exemplary embodiment the first wireless interface 212 may be a BLE interface. In an embodiment, first wireless interface instructions 224 may be a portion of instructions provided by the same entity that provides point-of-sale application instructions 222, and may communicate with other programs running on merchant device 29 (e.g., a BLE program running as part of an operating system of merchant device 29) via a communication standard or protocol (e.g., an application program interface for the BLE program).

In some embodiments, first wireless interface instructions 224 may include instructions for interacting with wireless interface 212. In some embodiments, processing unit 202 of merchant device 29 may execute first wireless interface instructions to send and receive messages to be transmitted, configure the first wireless interface 212 for operation, or perform any other suitable functions. In some embodiments, it may be possible to figure parameters relating to pairing/bonding (e.g., General Access Profile (GAP) settings, advertising modes, discovery modes, available roles, and white lists) and connections (e.g., General Attribute Protocol (GATT) settings, connection intervals, and maximum transmission units). In some embodiments, first wireless interface instructions may only be able to control and access information about only a limited subset of configuration parameters. First wireless interface instructions 224 may include instructions for communicating with payment reader 22 to determine information about such unavailable configuration parameters and to instruct the payment reader 22 to modify such configuration parameters. In this manner, by interacting with a payment reader 22, first wireless interface instructions 224 may be able to control aspects of the BLE connection (e.g., configuration parameters) that may otherwise be unavailable to a conventional application communicating with other operating software of merchant device 29.

In some embodiments, first wireless instructions 224 may include instructions for managing wireless pairing/bonding between first wireless interface 212 of merchant device 29 and wireless interface 108 of payment reader 22. In some embodiments, wireless instructions may enforce a structured procedure for establishing, maintaining, and modifying connections between payment reader 22 and merchant device 29. Although any suitable structured procedure may be implemented by first wireless instructions 224, in some embodiments an exclusive connection may be established between a single merchant device 29 and a single payment reader 22. Based on inputs from user interface 210, execution of instructions of point-of-sale application 222, and messages transmitted by payment reader 22, first wireless instructions 224 may allow for the selection between multiple payment readers 22 in proximity to the merchant device 29, establishing pairing/bonding with a selected payment reader 22, and breaking pairing/bonding once established.

In some embodiments, first wireless instructions 224 may include optimizing throughput of a wireless connection between the first wireless interface 212 of merchant device 29 and wireless interface 108 of the payment reader 22. In some embodiments, once a merchant device 29 and payment reader 22 are paired, configuration parameters for the BLE connection may be modified in order to optimize aspects of the connections, such as throughput. As described herein, it may be possible to modify some or all configuration parameters by communication with a BLE program of the merchant device 29 (e.g., by communicating via an API of an operating system of the merchant device 29). However, in some embodiments, it may only be possible to monitor and modify a limited subset of configuration parameters at merchant device 29, while the processing unit 120 of reader chip 100 of payment reader 22 may have low-level access to commands that are exchanged with wireless interface 108, such that payment reader 22 may modify numerous parameters that cannot be modified by a point-of-sale application running on a merchant device 29. Processing unit 202 may execute first wireless instructions 224 to communicate with payment reader 22 to determine current values for certain configuration parameters (e.g., maximum transmission units and connection intervals) and request that payment reader 22 modify those configuration parameters. In this manner, merchant device 29 may be able to monitor, manage, and modify configuration parameters through communication with payment reader 22.

In some embodiments, first wireless instructions 224 may include instructions for engaging in wireless communications between processing unit 204 of the merchant device 29 and processing unit 120 of payment reader 22, via the first wireless interface 224 of merchant device 29 and wireless interface 108 of the payment reader 22. During an active BLE connection, data packets may be exchanged via one or more BLE characteristics, with data packets able to be sent in modes such as an acknowledged and unacknowledged mode. In an unacknowledged mode, additional packets may be transmitted immediately after the unacknowledged packet was sent (i.e., an unreliable message). In an acknowledged mode, additional packets may not be sent until the acknowledgement packet has been acknowledged by the other BLE device (i.e., a reliable connection), which occurs during a later connection event between the two devices. In some embodiments, processing unit 204 of merchant device 29 may execute first wireless instructions 224 in order to selectively control the selection of acknowledged or unacknowledged packets, for example, based on the type of information being transmitted. In some embodiments, the merchant device 29 and payment reader 22 may combine acknowledgement packets and unacknowledged packets to be transmitted over a single messaging path during a single connection event, as described herein.

Figure 5:
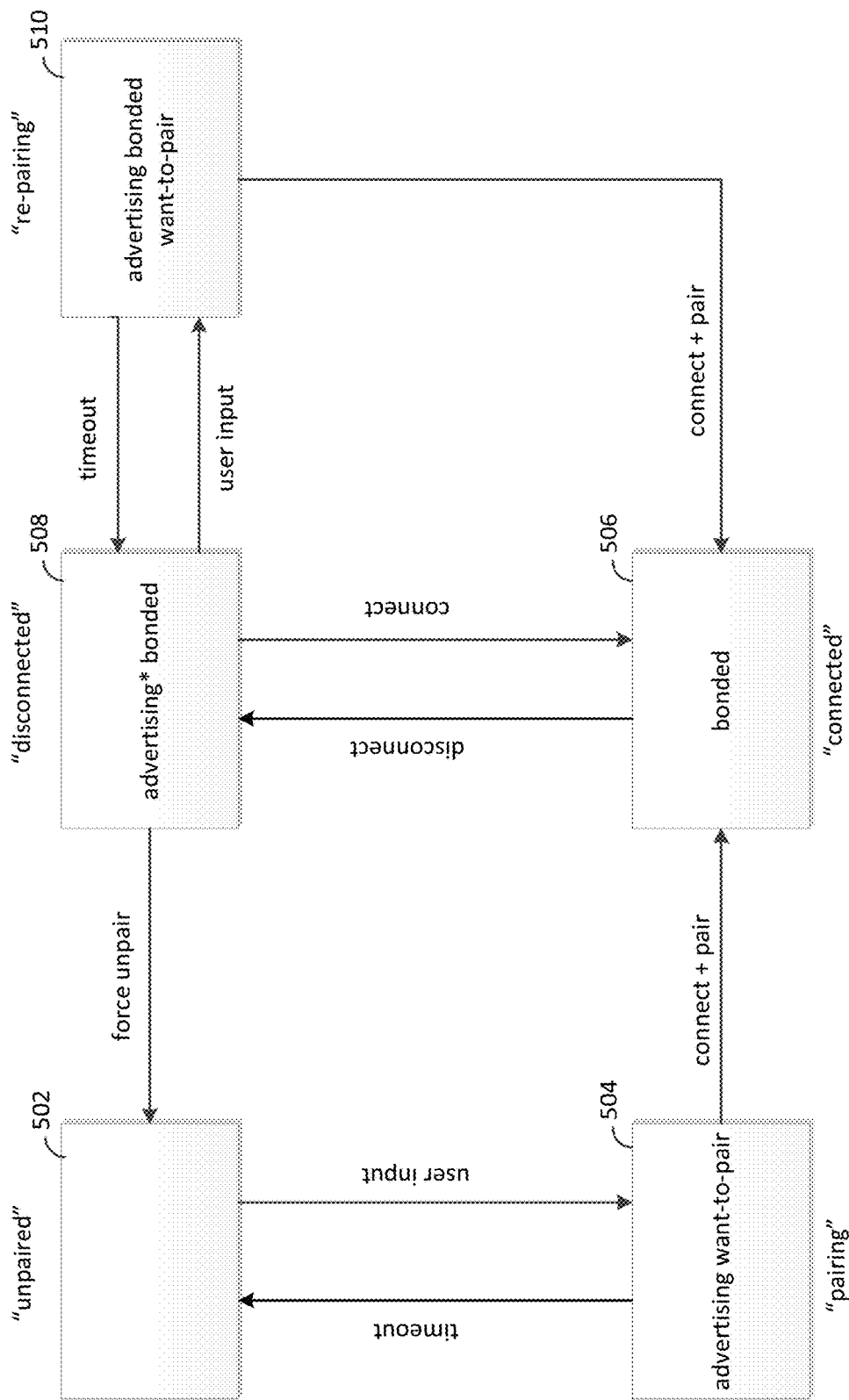
FIG. 5 depicts a non-limiting flow diagram illustrating a block diagram of establishing, maintaining, and modifying exclusive bonding of a wireless communication device.
Figure 6:
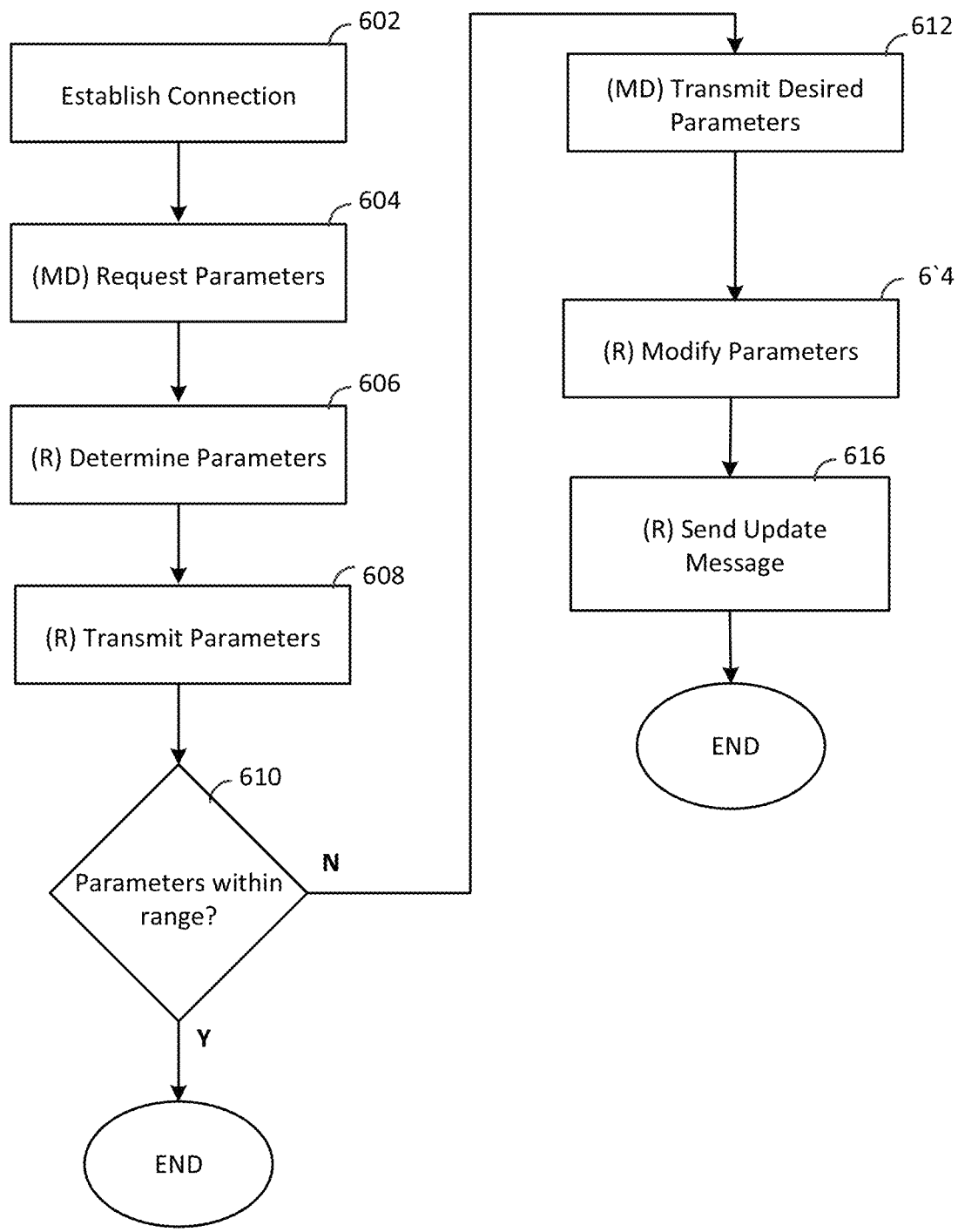
FIG. 6 depicts a non-limiting flow diagram illustrating steps for exchanging and modifying parameters of a wireless connection in accordance with some embodiments of the present disclosure.
Figure 7:
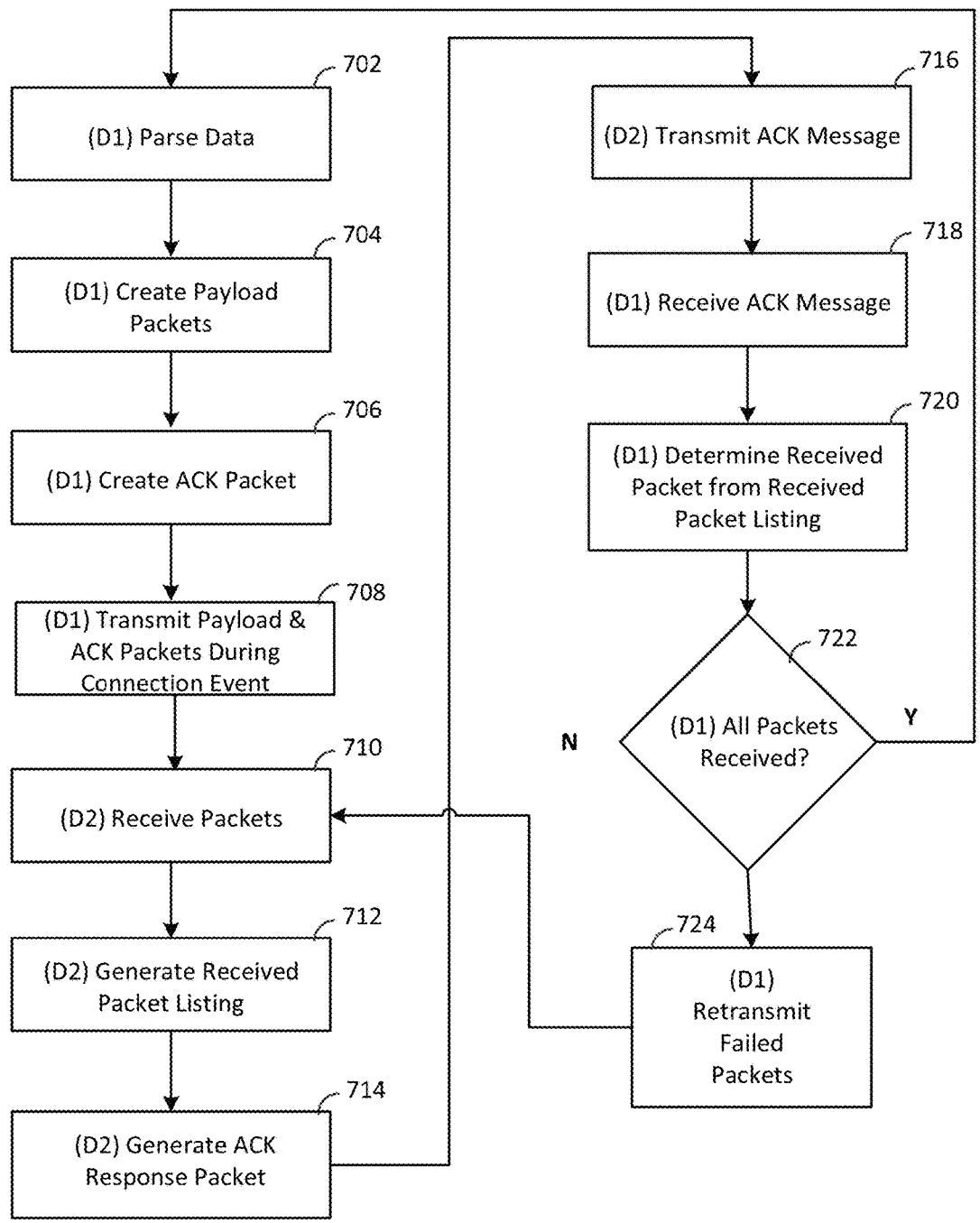
FIG. 7 depicts a non-limiting flow diagram illustrating of exchanging messages having combined packet types in accordance with some embodiments of the present disclosure.

In view of the structures and devices described supra, methods that can be implemented in accordance with the disclosed subject matter will be better appreciated with reference to the flowcharts of FIGS. 5-7. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 5 depicts an exemplary block diagram of establishing, maintaining, and modifying exclusive bonding of a wireless communication device such as payment reader 22. Although exclusive bonding may be managed in any suitable manner, in an exemplary embodiment payment reader 22 may include states that describe the current pairing/bonding state of the payment reader 22 and available options for moving to another state of the state diagram. It will be understood that while particular states and transitions between states may be depicted in FIG. 5, other suitable states may be included with the states of FIG. 5 and that different transitions between states may be available.

At block 502, payment reader 22 may be in an unpaired state, in which it is not/paired bonded with any merchant device 29. In one embodiment, the processing unit 120 of payment reader 22 may execute wireless instructions 128 to determine whether to transition from block 502. Although payment reader 22 may transition from block 502 in any suitable manner (e.g., periodically, in response to an advertising message received from a merchant device, etc.), in an exemplary embodiment payment reader 22 may transition to block 504 in response to a user input from user interface 112. In an exemplary embodiment of a user interface that is a button, the payment reader may transition from block 502 to block 504 in response to a particular button push such as a holding and releasing the button for a more than a threshold time or entering a particular sequence of button pushes.

At block 504, payment reader 22 may be in a pairing state, in which it is not/paired bonded with any merchant device 29 but is advertising that it wishes to pair with a merchant device 29. While in the pairing state, the processing unit 120 of payment reader 22 may execute wireless instructions 128 to cause wireless interface 108 to broadcast advertising packets. In some embodiments, the advertising packets may include identifying information that allows a receiving merchant device 29 to distinguish the payment reader 22 from other BLE devices (e.g., in identifier unique to payment readers, an identifier for the particular payment reader, or an identifier that may be compared to a white list) and to identify the particular payment reader 22 (e.g., a payment reader name that may be displayed at a user interface of merchant device 29). In an embodiment, the payment reader 22 may continue to transmit the advertising packet at intervals for up to a threshold time period (e.g., a timeout threshold), and if the threshold is exceeded the payment reader may transition back to the unpaired state of block 502. Merchant devices 29 may be monitoring for advertising packets from payment readers. In response to received advertising packets (and in some embodiments, a user selection at user interface 210 of merchant device 29), a merchant device may send a connection request to payment reader 22. In response to the connection request, payment reader 22 may pair and connect with merchant device 29 and transition to state 506.

At block 506 payment reader 22 may be in a connected state, in which it is bonded with a merchant device 29. Processing unit 120 of payment reader 22 may execute wireless instructions 128 to communicate with merchant device via wireless interface 108 of payment reader 22 and first wireless interface 212 of merchant device 29. As described herein, the payment reader 22 and merchant device 29 may communicate using BLE to engage in payment transactions and perform other functions (e.g., configure a payment reader, provide firmware updates, and configure the BLE connection). Under certain conditions (e.g., expiration of a threshold time since the last communication between the payment reader 22 and merchant device 29), the payment reader 22 and merchant device 29 may break their connection while remaining bonded, transitioning to state 508.

At block 508, payment reader 22 may remain in a bonded state with the merchant device 29 but may not presently be connected with the merchant device 29. In this state, processing unit 120 of payment reader 22 may execute wireless instructions 128 to transmit its advertising packets via wireless interface 108. In state 508, the payment reader may not be permitted to bond with other merchant devices 29, but may transition to other states based on a variety of user inputs or communications with merchant device 29. In an embodiment, the bonded merchant device 29 may send a message to reestablish the connection, and payment reader 22 may transition to state 506. Payment reader 22 may also receive user inputs (e.g., at a button of payment reader 22) that may cause the payment reader 22 to transition to different states. For example, user inputs may be received at user interface 112 of payment reader 22 (e.g., holding and releasing a button for a threshold time period or a particular pattern of button pushes) to transition to either state 502 or state 510. In one embodiment, a transition to state 502 (e.g., in response to an extended button push) may cause payment reader 22 to unpair from the bonded payment reader and return to the unpaired stated. A transition to state 510 (e.g., in response to a shorter button push) may cause the payment reader to enter a state where payment reader transits the advertising message and is permitted to pair with merchant devices 29 other than the bonded merchant device 29.

At block 510, payment reader 22 may be in a re-pairing state, in which it is bonded with a merchant device 29 and is advertising that it is able to pair with a different merchant device 29. While in the re-pairing state, the processing unit 120 of payment reader 22 may execute wireless instructions 128 to cause wireless interface 108 to broadcast advertising packets. In some embodiments, the advertising packets may include identifying information that allows a receiving merchant device 29 to distinguish the payment reader 22 from other BLE devices (e.g., in identifier unique to payment readers, an identifier unique to the payment reader, or an identifier that may be compared to a white list) and to identify the particular payment reader 22 (e.g., a payment reader name that may be displayed at a user interface of merchant device 29). In an embodiment, the payment reader 22 may continue to transmit the advertising packet at intervals for up to a threshold time period (e.g., a timeout threshold), and if the threshold is exceeded the payment reader may transition back to the disconnected state of block 508. Merchant devices 29 may be monitoring for advertising packets from payment readers. In response to received advertising packets (and in some embodiments, a user selection at user interface 210 of q merchant device 29), a different merchant device 29 than the bonded merchant device 29 may send a pairing request to payment reader 22. In response to the pairing request, payment reader 22 may unpair from the bonded merchant device 29 and connect with the new merchant device 29, and transition to the connected state 506.

FIG. 6 depicts a flow diagram illustrating steps for exchanging and modifying parameters of a wireless connection in accordance with some embodiments of the present disclosure. Although configuration parameters may be exchanged and modified in any suitable manner, in an embodiment a payment reader 22 may be a custom device that may have lower-level access to configuration parameters of a BLE connection (e.g., through communications between processing unit 120 of reader chip 100 and processing unit 130 of wireless interface 108) than an application running on a merchant device 29, which may be a smart phone, table, terminal, or other device with an operating system such iOS, Android, or Windows.

At step 602, a payment reader 22 and a merchant device 29 may establish a BLE connection. Although a BLE connection may be established in any suitable manner, in an embodiment the BLE connection may be established as described in FIG. 5 herein. Processing may then continue to step 604.

At step 604, a processing unit 204 of merchant device 29 executing point-of-sale application instructions 222 and associated first wireless interface instructions 224 may identify configuration parameters that are not available at merchant device 29. Although merchant device 29 may seek information about any suitable configuration parameters relating to any suitable aspects of the BLE connection with the payment reader 22, in an embodiment merchant device 29 may seek information about configuration parameters that are related to available data throughput, such as maximum transmission unit (MTU) size and connection interval length. MTU size may relate the maximum amount of data that may be transmitted in a single packet. In order to increase throughput, it may be desired to increase the MTU size. In addition, knowledge of the MTU size may facilitate the correct packaging of incoming data portions into packets for transmission via the BLE connection. Connection intervals may relate to how often the connected merchant device 29 and payment reader 22 have connection events during which packets may be exchanged. By reducing the connection interval, it may be possible to increase the effective transmission rate over the BLE connection. Once the merchant device 29 has identified the configuration parameters to request, it may transmit them to the payment reader 22 via the BLE connection. Processing may then continue to step 606.

At step 606, the payment reader 22 may receive the request for configuration parameters via the BLE connection, and processing unit 120 of reader chip 100 may execute wireless instruction 128 to communicate with processing unit 130 of wireless interface 108 to access information about the requested configuration parameters. Once the requested information has been accessed, processing may continue to step 608.

At step 608, processing unit 120 of reader chip 100 may execute wireless instruction 128 to generate one or more BLE packets to be transmitted to the merchant device via wireless interface 108 of payment reader 22 and first wireless interface 212 of merchant device 29. The one or more BLE packets may include the request information (e.g., the requested configuration parameters). Once the configuration parameters have been transmitted, processing may continue to step 610.

At step 610, merchant device 29 may receive the configuration parameters from payment reader 22, and processing unit 202 of merchant device 29 may execute first wireless interface instructions 224 to determine whether the configuration parameters are within an acceptable or desired range. For example, it may be determined whether the MTU size is greater than or equal to a threshold MTU size, and whether the connection interval is less than or equal to a threshold connection interval length. If the configuration parameters are within the desired range processing may end. If the configuration parameters not within the desired range, processing may continue to step 612.

At step 612, a processing unit 204 of merchant device 29 executing point-of-sale application instructions 222 and associated first wireless interface instructions 224 may determine values for configuration parameters to send to payment reader 22, such that payment reader 22 may modify the values for those configuration parameters. As described herein, merchant device 29 may have a range for certain configuration parameters (e.g., for MTU size and connection interval). Values for the configuration parameters may be transmitted from first wireless interface 212 of merchant device 29 to wireless interface 108 of payment reader 22. Processing may continue of step 614.

At step 614, the payment reader 22 may receive the request for configuration parameters via the BLE connection, and processing unit 120 of reader chip 100 may execute wireless instruction 128 to communicate with processing unit 130 of wireless interface 108 to modify the values for the configuration parameters as requested in the message. Once the values of the configuration have been modified, processing may continue to step 616.

At step 616, processing unit 120 of reader chip 100 may execute wireless instruction 128 to generate a message indicating that the configuration parameters have been updated and transmit the message to the merchant device 29 via wireless interface 108 of payment reader 22 and first wireless interface 212 of merchant device 29. Once the update message has been transmitted, the processing of FIG. 6 may end.

FIG. 7 depicts a flow diagram illustrating exchanging messages having combined packet types in accordance with some embodiments of the present disclosure. As described herein, when two devices (e.g., a payment reader 22 and a merchant device 29) are connected, they may exchange data via characteristics. For each characteristic, packets may be sent in an unacknowledged mode (e.g., an unreliable packet) or an acknowledgement mode (e.g., a reliable packet). As described for FIG. 7, both unreliable and reliable packets may be transmitted during a single connection event through a single messaging path (e.g., a single characteristic). The steps of FIG. 7 may be performed between any suitable connected devices, and in one embodiment, both the transmitting device (first device) and the responding device (second device) may be either of a payment reader 22 or a merchant device 29. In an exemplary embodiment as described in FIG. 7, processing unit 102 of payment reader 22 may execute wireless instructions 128 to communicate with processing unit 130 of wireless interface 108, whether operating as a first device or second device. In a similar manner, in an exemplary embodiment processing unit 202 of merchant device 29 may execute first wireless interface instructions 224 to communicate with first wireless interface 212, whether operating as a first device or a second device.

At step 702, a first device may have data to transmit to a second device, and may parse the data into data portions to be packetized to be sent to the second device. Although data may be parsed in any suitable manner, in an embodiment it may be possible to send a certain number of unacknowledged data packets during a connection event, and each unacknowledged packet may accommodate a certain amount of data (e.g., based on a MTU size). Thus, the data may be parsed into data portions, with each data portion corresponding to the payload of an unacknowledged packet. Once the data has been parsed into data portions, processing may continue to step 704.

At step 704, the first device may generate payload packets based on the data portions. In an embodiment, each data portion may form a payload of a payload packet and a unique packet identifier may be included with each packet, as well as other suitable information (e.g., packet headers, error checking, etc.). Each payload packet may be generated as an unacknowledged packet. Once the payload packets are generated, processing may continue to step 706.

At step 706, the first device may generate an acknowledgement packet that is associated with the payload packets. Once the acknowledgement packet is generated, processing may continue to step 708.

At step 708, the first device may transmit the payload packets and the acknowledgement packet to the second device over the BLE connection. In an embodiment, the payload packets may be sent prior to the acknowledgement packet, such that the acknowledgement packet may be sent as the last packet during the connection event. As described herein, the packets may be sent over a single messaging path (e.g., a single characteristic). Once the payload packets and acknowledgement packet have been transmitted, processing may continue to step 710.

At step 710, the second device may receive packets from the first device over the BLE connection, demodulating the transmission, extracting the payload from each of the received packets, and determining whether each packet is an acknowledged packet or an unacknowledged packet. Once the received packets have been processed, processing may continue to step 712.

At step 712, the second device may determine the packet identifiers associated with each of the unacknowledged packets that were received over the single messaging path during a single connection event at step 710. The second device may then generate a received packet listing that includes each of the packet identifiers from the received payload (i.e., unacknowledged) packets. Processing may then continue to step 714.

At step 714, the second device may generate an acknowledgement response packet to be transmitted to the first device. Although the acknowledgement response packet may include any suitable information, in an embodiment the acknowledgement response packet may include information identifying the acknowledgement response packet as responsive to the acknowledgement packet, and the payload of the acknowledgement response packet may include the received packet listing from step 712. Once the acknowledgement response packet has been generated processing may continue to step 716.

At step 716, the second device may transmit the acknowledgement response packet to the first device (e.g., during the next connection event). Once the acknowledgment response packet has been transmitted to the first device, processing may continue to step 718.

At step 718, the first device may receive the acknowledgement response packet from the second device over the BLE connection, demodulating the transmission and extracting the payload from the acknowledgement response packet. Once the acknowledgment response packet has been processed, processing may continue to step 720.

At step 720, the first device may determine the received packet listing based on the payload data of the received acknowledgment response packet. Once the received packet listing has been determined, processing may continue to step 722.

At step 722, the first device may compare the received packet listing to the packet identifiers associated with the unacknowledged packets that were sent during the first connection event to determine if any failed packets need to be retransmitted. If all of the packets are represented in the received packet listing processing may return to step 702 to process a new set of data. If all of the packets were not represented in the received packet listing and a failed packet should be retransmitted, processing may continue to step 724.

At step 724, the first device may retransmit any failed packets that were not represented in the received packet listing, along with another acknowledgement packet, during the next connection event. In some embodiments, the first device may also transmit additional payload packets along with the retransmitted packets. Processing may then return to step 710.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method of wireless communications between a payment reader and a merchant device, the method comprising:

establishing a wireless connection between the payment reader and the merchant device, wherein one or more connection events are associated with the wireless connection;

generating, at the merchant device, a plurality of data portions;

generating, at the merchant device, a plurality of payload packets, wherein each of the plurality of payload packets includes a packet identifier, one of the data portions, and information indicating that the respective payload packet does not require an acknowledgement before an additional payload packet may be transmitted;

generating, at the merchant device, an acknowledgement packet, wherein the acknowledgement packet includes acknowledgement information indicating that an acknowledgement is required before any additional packets may be transmitted;

transmitting the plurality of payload packets to the payment reader;

transmitting the acknowledgement packet to the payment reader after transmitting the plurality of payload packets, wherein the plurality of payload packets and the acknowledgement packet are exchanged through a single messaging path, and wherein the plurality of payload packets and the acknowledgement packet are transmitted during a first connection event;

determining, for each of the one or more payload packets successfully received at the payment reader, the packet identifier associated with the successfully received payload packet;

generating, at the payment reader, a received packet listing based on the one or more determined packet identifiers;

generating, at the payment reader, an acknowledgement response packet, wherein the acknowledgement response packet is responsive to the acknowledgement information and wherein the acknowledgement response packet includes the received packet listing;

transmitting the acknowledgement response packet from the payment reader to the merchant device during a second connection event;

identifying, at the merchant device, one or more failed data packets of the payload packets based on the received packet listing of the acknowledgement response packet; and transmitting, from the merchant device, the one or more failed data packets to the payment reader.

2. The method of claim 1, further comprising:
determining a maximum transmission unit for the plurality of payload packets, wherein the maximum transmission unit defines the size of each of the payload packets; and
determining the size of each of the data portions based on the maximum transmission unit.

3. The method of claim 1, wherein the single messaging path comprises a single characteristic.

4. The method of claim 1, further comprising:
determining, at the merchant device, that all of the payload packets were received based on the received packet listing of the acknowledgement response packet; and
transmitting, from the merchant device, a second plurality of payload packets during a third connection event when all of the payload packets were received.

5. The method of claim 1, wherein each of the plurality of payload packets is sent in an unacknowledged mode and the acknowledgment packet is sent in an acknowledged mode.

6. The method of claim 1, further comprising:
determining, at the payment reader, whether a received packet is a payload packet or an acknowledgment packet based on whether the received packet contains (a) information indicating that the respective payload packet does not require an acknowledgement or (b) acknowledgement information indicating that an acknowledgement is required.

7. A method, comprising:
establishing a wireless connection between a first wireless device and a second wireless device, wherein one or more connection events are associated with the wireless connection;
generating, at the first wireless device, a plurality of data portions;
generating, at the first wireless device, a plurality of payload packets, wherein each of the plurality of payload packets comprises one of the data portions and information indicating that the respective payload packet does not require an acknowledgement before an additional payload packet may be transmitted;
generating, at the first wireless device, an acknowledgement packet, wherein the acknowledgement packet includes acknowledgement information indicating that an acknowledgement is required;
transmitting the plurality of payload packets from the first wireless device to the second wireless device;
transmitting the acknowledgement packet from the first wireless device to the second wireless device after transmitting the plurality of payload packets, wherein the plurality of payload packets and the acknowledgement packet are exchanged through a single messaging path, and wherein the plurality of payload packets and the acknowledgement packet are transmitted during a first connection event;
receiving, at the first wireless device, an acknowledgement response packet from the second wireless device during a second connection event, wherein the acknowledgement response packet is responsive to the acknowledgement information, and wherein the acknowledgement response packet comprises a received packet listing;
identifying, at the first wireless device, one or more failed data packets based on the received packet listing; and
transmitting the one or more failed data packets from the first wireless device to the second wireless device.

8. The method of claim 7, further comprising:
determining a maximum transmission unit for the plurality of payload packets, wherein the maximum transmission unit defines the size of each of the payload packets; and
determining the size of each of the data portions based on the maximum transmission unit.

9. The method of claim 7, wherein the single messaging path comprises a single characteristic.

10. The method of claim 7, further comprising:
determining, at the first wireless device, that all of the payload packets were received based on the received packet listing; and
transmitting, at the first wireless device, a second plurality of payload packets during a third connection event when all of the payload packets were received.

11. The method of claim 7, wherein the acknowledgement information indicates that an acknowledgement must be received at the first wireless device before any additional packets may be transmitted by the first wireless device.

12. The method of claim 7, wherein a connection interval is associated with the wireless connection, and wherein the connection interval determines the time between consecutive connection events.

13. The method of claim 7, wherein a packet identifier is associated with each of the plurality of payload packets, and wherein identifying the one or more failed packets comprises identifying the one or more failed packets based on the received packet listing and the packet identifiers.

14. The method of claim 13, wherein each payload packet includes its associated packet identifier, and wherein the received packet listing is based on one or more of the packet identifiers.

15. A wireless device, comprising:
 a wireless communication interface configured to transmit and receive payload packets and acknowledgement packets through a single messaging path, wherein each acknowledgement packet includes acknowledgement information indicating that an acknowledgement is required, and wherein each payload packet includes information indicating that the payload packet does not require an acknowledgement before an additional payload packet may be transmitted;
 a memory configured to store wireless instructions;
 a processing unit configured:
  (a) to execute the wireless instructions to establish a wireless connection between the wireless device and a second wireless device, wherein one or more connection events are associated with the wireless connection,
  (b) to generate a plurality of data portions,
  (c) to generate a plurality of payload packets, wherein each of the plurality of payload packets comprises one of the data portions,
  (d) to generate an acknowledgement packet,
  (e) to transmit the plurality of payload packets to the second wireless device,
  (f) to transmit the acknowledgement packet to the second wireless device after transmitting the plurality of payload packets, wherein the plurality of payload packets and the acknowledgement packet are transmitted during a first connection event,
  (g) to receive an acknowledgement response packet from the second wireless device during a second connection event, wherein the acknowledgement response packet is responsive to the acknowledgement information, and wherein the acknowledgement response packet comprises a received packet listing,
  (h) to identify one or more failed data packets based on the received packet listing, and
  (i) to transmit the one or more failed data packets from the first wireless device to the second wireless device.

16. The wireless device of claim 15, wherein the processing unit is further configured to determine a maximum transmission unit for the plurality of payload packets, wherein the maximum transmission unit defines the size of each of the payload packets, and to determine the size of each of the data portions based on the maximum transmission unit.

17. The wireless device of claim 15, wherein the single messaging path comprises a single characteristic.

18. The wireless device of claim 15, wherein the processing unit is further configured to determine that all of the payload packets were received based on the received packet listing, and transmit a second plurality of payload packets during a third connection event when all of the payload packets were received.

19. The wireless device of claim 15, wherein the acknowledgement information indicates that an acknowledgement must be received at the wireless device before any additional packets may be transmitted by the wireless device.

20. The wireless device of claim 15, wherein a connection interval is associated with the wireless connection, and wherein the connection interval determines the time between consecutive connection events.

21. The wireless device of claim 15, wherein each payload packet includes an associated packet identifier, wherein the received packet listing is based on one or more of the packet identifiers, and wherein the one or more failed packets are identified based on the received packet listing and the packet identifiers.

22. A non-transitory computer-readable storage medium comprising instructions stored therein, which, when executed by one or more processors, cause the one or more processors to perform operations comprising:
 establishing a wireless connection between a first wireless device and a second wireless device, wherein one or more connection events are associated with the wireless connection;
 generating a plurality of data portions;
 generating a plurality of payload packets, wherein each of the plurality of payload packets comprises one of the data portions and information indicating that the respective payload packet does not require an acknowledgement before an additional payload packet may be transmitted;
 generating an acknowledgement packet, wherein the acknowledgement packet includes acknowledgement information indicating that an acknowledgement is required;
 providing the plurality of payload packets to be transmitted from the first wireless device to the second wireless device;
 providing an acknowledgement packet to be transmitted from the first wireless device to the second wireless device after transmitting the plurality of payload packets, wherein the plurality of payload packets and the acknowledgement packet are exchanged through a single messaging path, and wherein the plurality of payload packets and the acknowledgement packet are transmitted during a first connection event;
 receiving an acknowledgement response packet from the second wireless device during a second connection event, wherein the acknowledgement response packet is responsive to the acknowledgement information, and wherein the acknowledgement response packet comprises a received packet listing;
 identifying one or more failed data packets based on the received packet listing; and
 providing the one or more failed data packets to be transmitted from the first wireless device to the second wireless device.

23. The non-transitory computer-readable storage medium of claim 22, wherein the instructions further comprise instructions that cause the one or more processors to perform operations comprising:
 determining a maximum transmission unit for the plurality of payload packets, wherein the maximum transmission unit defines the size of each of the payload packets; and
 determining the size of each of the data portions based on the maximum transmission unit.

24. The non-transitory computer-readable storage medium of claim 22, wherein the single messaging path comprises a single characteristic.

25. The non-transitory computer-readable storage medium of claim 22, wherein the instructions further comprise instructions that cause the one or more processors to perform operations comprising:
 determining that all of the payload packets were received based on the received packet listing; and
 providing a second plurality of payload packets to be transmitted during a third connection event when all of the payload packets were received.

26. The non-transitory computer-readable storage medium of claim 22, wherein the acknowledgement information indicates that an acknowledgement must be received at the first wireless device before any additional packets may be transmitted by the first wireless device.

27. The non-transitory computer-readable storage medium of claim 22, wherein a connection interval is associated with the wireless connection, and wherein the connection interval determines the time between consecutive connection events.

28. The non-transitory computer-readable storage medium of claim 22, wherein a packet identifier is associated with each of the plurality of payload packets, and wherein identifying the one or more failed packets comprises identifying the one or more failed packets based on the received packet listing and the packet identifiers.

29. The non-transitory computer-readable storage medium of claim 28, wherein each payload packet includes its associated packet identifier, and wherein the received packet listing is based on one or more of the packet identifiers.

\* \* \* \* \*